United States Patent [19]

Perrotti et al.

[11] E Re. 29,338

[45] Reissued Aug. 2, 1977

[54] PROCESS FOR THE PREPARATION OF ESTERS OF CARBONIC ACID

[75] Inventors: Emilio Perrotti; Gioacchino Cipriani, both of San Donato Milanese, Italy

[73] Assignee: Snam Progetti S.p.A., San Donato Milanese, Italy

[21] Appl. No.: 727,348

[22] Filed: Sept. 28, 1976

Related U.S. Patent Documents

Reissue of:

[64] Patent No.: 3,846,468
Issued: Nov. 5, 1974
Appl. No.: 121,193
Filed: Mar. 4, 1971

[30] Foreign Application Priority Data

Mar. 4, 1970 Italy ..... 21468/70

[51] Int. Cl.[2] ..... C07C 69/00
[52] U.S. Cl. ..... 260/463
[58] Field of Search ..... 260/463

[56] References Cited

U.S. PATENT DOCUMENTS

| | | | |
|---|---|---|---|
| 3,114,762 | 12/1963 | Mador et al. | 260/463 |
| 3,579,568 | 5/1971 | Heck et al. | 260/497 |
| 3,625,995 | 12/1971 | Brattesani | 260/486 AC |
| 3,846,468 | 11/1974 | Perrotti et al. | 260/463 |

FOREIGN PATENT DOCUMENTS

| | | | |
|---|---|---|---|
| 7011129 | 4/1970 | Japan | 260/463 |

OTHER PUBLICATIONS

Tetrahedron Letters, No. 7, pp. 831–833 (1968).

*Primary Examiner*—Delbert R. Phillips
*Attorney, Agent, or Firm*—Ralph M. Watson

[57] ABSTRACT

A process is described whereby carbonic acid esters, i.e., alkyl, aryl and cycloalkyl carbonates, are prepared by reacting an alcohol with oxygen and carbon monoxide in the presence of a catalyst selected from copper complexed with an organic molecule.

6 Claims, No Drawings

PROCESS FOR THE PREPARATION OF ESTERS OF CARBONIC ACID

Matter enclosed in heavy brackets [ ] appears in the original patent but forms no part of this reissue specification; matter printed in italics indicates the additions made by reissue.

The present invention refers to a process for the preparation of esters of carbonic acid. Esters of carbonic acid are known which are useful as solvents and polymerization agents in the production of polycarbonates by transesterification with glycols and diphenols. Alkyl, alkyl-aryl or aryl carbonates are employed in this case.

According to the known art the above esters are obtained by reacting an alcohol or a glycol with phosgene or chloroformiates in the presence of bases selected from the group consisting either of hydroxides, alkaline or alkaline-earth carbonates, or of pyridine or other organic bases. In the first case the reaction is carried out in the presence of solvents and at a controlled temperature in order to get the final products out of the hydrolysis by the same bases and the water anyhow present in the reaction vessel.

We have now found it possible to prepare esters of carbonic acid by reacting the alcohol for esterification with carbon monoxide and oxygen in the presence of suitable catalysts. The reaction goes on up to quantitative yields with respect to the fed reactants.

The process according to the present invention may be substantially schematized by the following way:

$$2ROH + CO + \tfrac{1}{2}O_2 \xrightarrow{MX_nL_m} ROC(=O)OR + H_2O$$

wherein R is a hydrocarbon radical selected from the alkyl, aryl or cycloalkyl radicals.

The reaction is catalyzed by complexes of metals (M) of the 1st B, 2nd B and 8th group of the periodic system. Very suitable metals are Cu, Ag, Au, Zn, Cd, Hg, Fe, Co, Ni. i.e., metals able to exist in two different valence conditions by means of redox reactions. The corresponding metal ions are able to carry out the above reaction only with very low yields and through very unfavourable kinetics. Very suitable catalysts are the complex molecules having the formula $MX_nL_m$ wherein n ranges between 1 and 3, m ranges between 5 and 3. X is an anion and L is a neutral ligand. The complex may be a saline complex too as $[ML_m]^{+n}$ n $X^-$. The n + m sum is generally equal to six. i.e. the complexes may exist at the most in a hexacoordination state, which may dissociate in solution. The more suitable anions are halide ions, CN, $ClO_4^-$, complex anions as $BF_4^-$ and the like. The L ligands are selected from the group consisting of organic bases as pyridine, dipyridyl, imidazole, phenanthroline, alkyl or aryl phosphines, dimethylsulfoxide, dimethylformamide, quinuclidine, CO; suitable ligands are also the nitriles as $CH_3CN$, $C_6H_5CN$, and the bidentate ligands are malonitrile, succinodinitrile, adiponitrile and the like.

The inventive reaction will be illustrated by the unrestrictive employment of complexes of Cu, Co and Au. It is preferable that the complexes contain the aforesaid metals in their lower oxidation state; from a kinetic point of view it is interesting to use the carbonyl compounds obtained from the above complexes; they are prepared before being introduced into the reaction vessel and then are put therein.

The reaction is carried out in a solvent consisting either of alcohol to be oxidized or of a mixture of the alcohol with an inert solvent. The latter is selected with the view of removing of the reaction water by means of an azeotropic distillation. Therefore the more suitable solvents are $CCl_4$, $C_6H_6$, $CH_3—C_6H_5$ and the like.

The complex may be obtained by starting from the metal ion dissolved in the solvent to which a stoichiometric amount of the complexing base is added. It is generally prepared in advance, characterized and then introduced into the reaction vessel.

The inventive process may be carried out in a wide range of pressures and temperatures and conveniently runs out of atmospheric pressure and room temperature too. Both factors may be usefully changed in order to advantageously influence the reaction kinetics and their limit values depend only on the boiling temperature of the mixture or on the firmness of the introduced catalyst. The temperature generally ranges between −20° C and +110° C and preferably between 50° and 70° C. The inventive reaction satisfactorily runs at room pressure, but it is preferable to increase the partial pressure of CO to values higher than the atmospheric one up to 3 + 4 atmospheres. This fact kinetically favours the reaction owing to the stabilization of the carbonyl derivatives which are the process catalysts.

The invention is now illustrated by the following unrestrictive examples:

EXAMPLE 1

0.424 g of $Cu_2Cl_2$ were dissolved into 25 cc. of methyl alcohol and 25 cc of pyridine. The obtained solution was oxidized by $O_2$ at room pressure and temperature, then was put into a CO atmosphere at one atmosphere pressure and at a temperature of 25° C. After the carbon monoxide has stoichiometrically been absorbed, the solution was subjected to gas-chromatography analysis.

An amount of 0.370 g of $CO(OCH_3)_2$ was found by means of a gas-chromatography comparison with standard samples; the said amount was equal to 96.2% with respect to Cu. The yield was quantitative.

Three other following cycles of $O_2$ and CO absorption were carried out on the same solution:

| | | | |
|---|---|---|---|
| II | cycle | $CO(OCH_3)_2$ | g. 0.730 |
| III | cycle | $CO(OCH_3)_2$ | g. 1.080 |
| IV | cycle | $CO(OCH_3)_2$ | g. 1.450 |

Neither by-products nor $CO_2$ were observed in the discharge gases obtained by all the above operations.

EXAMPLE 2

0.378 g of $Cu_2Cl_2$ were dissolved into 25 cc of ethyl alcohol, 2.41 g of dipyridyl being present. The obtained solution was oxidized by $O_2$ at room temperature and pressure, then it was put into a CO atmosphere at one atmosphere pressure and at a temperature of 25° C. After the carbon monoxide has stoichiometrically been absorbed the solution was subjected to gas-chromatography analysis. An amount of 0.440 g of $CO(OC_2H_5)_2$ was found by means of a gas-chromatography comparison with standard samples; the said amount was equal to 97.5% with respect to Cu. The yield was quantitative.

Two other following cycles of $O_2$ and CO absorption were carried out on the same solution:

| | | | |
|---|---|---|---|
| II | cycle | $CO(OC_2H_3)_2$ | g. 0.870 |
| III | cycle | $CO(OC_2H_3)_2$ | g. 1.315 |

Neither by-products nor $CO_2$ were observed in the discharge gases obtained by the above operations.

EXAMPLE 3

0.400 g of $Cu_2Cl_2$ were dissolved into 25 cc of benzyl alcohol, 3.20 g of ortho-phenantroline being present. The obtained solution was oxidized by $O_2$ at room temperature and pressure, then it was put into a CO atmosphere at one atmosphere pressure and at a temperature of 25° C. After the carbon monoxide has stoichiometrically been absorbed the solution was subjected to gas-chromatography analysis.

An amount of 0.970 g of benzyl carbonate was found by means of a gas-chromatography comparison with standard samples; the said amount was equal to 96% with respect to Cu. The yield was quantitative.

Two other following cycles of $O_2$ and CO absorption were carried out on the same solution:

| | | | |
|---|---|---|---|
| II | cycle | $CO(OCH_2C_6H_5)_2$ | g. 1.930 |
| III | cycle | $CO(OCH_2C_6H_5)_2$ | g. 8.900 |

Neither by-products nor $CO_2$ were observed in the discharge gases obtained by the above operations.

EXAMPLE 4

0.085 g of $Cu_2Cl_2$ were dissolved into 3 cc of anhydrous pyridine. The solution was put into a CO atmosphere up to the absorption of almost a stoichiometric volume of carbon monoxide, by checking the appearance of the carbonyl band at 8080 $cm^{-1}$ by means of I.R. examination. The solution was then diluted by 25 cc of ethyl alcohol and subjected to the action of a mixture of CO and $O_2$ in a ratio of 2:1 and diluted by 20% of $N_2$, the said operation being carried out in an autoclave, at the pressure of 4 atmospheres and the temperature of 45° C. The reaction was protracted for about 5 hours; the solution was then cooled to room temperature, subjected to a CO stream for 15 feet and analyzed by gas-chromatography and mass-spectroscopy. The gas-chromatography examination showed a solution amount of 3.75 g of ethylcarbonate, by comparison with synthesis samples.

Other by-products were not observed in solution and $CO_2$ was absent in the discharge gases. The same solution was again allowed to react in the same conditions and for the same time.

By means of gas-chromatography analysis it was possible to observe a doubling of the carbonate concentration within the limits of experimental error.

What we claim is:

1. A process for the preparation of esters of carbonic acid having the general formula:

$$\mathrm{ROC(=O)OR}$$

wherein R is a hydrocarbon radical selected from the class consisting of alkyl, aryl or cycloalkyl radicals characterized in that an alcohol represented by the formula ROH in which R has the aforesaid meaning is reacted with carbon monoxide and oxygen in the presence of a catalyst consisting of cuprous chloride complexed with an organic ligand selected from the group consisting of pyridine, dipyridyl, imidazole, phenanthroline alkyl or aryl, phosphines, dimethylsulfoxide, dimethylformamide, quinuclidine, $CH_3CN$, $C_6H_5CN$, malonitrile, succinodinitrile and adiponitrile.

2. A process according to claim 1 characterized in that the reaction is carried out in a solvent adapted to produce azeotropic mixtures with water and selected from:

a. the same alcohol as that from which the ester is prepared;

b. an organic compound adapted to be complexed by the employed catalyst;

c. an inert solvent; or a mixture of the said solvents.

3. A process according to claim 2 characterized in that the solvent is the reactant alcohol and the catalyst is put in as a complex.

4. A process according to claim 1 characterized in that the temperature is preferably selected in the range from −20° C to +110° C.

5. A process according to claim 4 characterized in that the pressure is sufficient to ensure that the employed solvent will be kept in the liquid state at the process temperature.

*6. A process for the preparation of esters of carbonic acid having the general formula:*

$$\mathrm{ROC(=O)OR}$$

*wherein R is a hydrocarbon radical selected from the class consisting of alkyl, aryl or cycloalkyl radicals characterized in that an alcohol represented by the formula ROH in which R has the aforesaid meaning is reacted with carbon monoxide and oxygen in the presence of a catalyst consisting of cuprous chloride complexed with an organic ligand selected from the group consisting of pyridine, dipyridyl, imidazole, phenanthroline alkyl or aryl, phosphines, dimethylsulfoxide, dimethylformamide, quinuclidine, CO, $CH_3CN$, $C_6H_5CH$, malonitrile, succinodinitrile and adiponitrile.*

* * * * *

UNITED STATES PATENT AND TRADEMARK OFFICE

CERTIFICATE OF CORRECTION

PATENT NO. : RE. 29,338

DATED : August 2, 1977

INVENTOR(S) : Emilio Perrotti and Gioacchino Cipriani

It is certified that error appears in the above-identified patent and that said Letters Patent are hereby corrected as shown below:

Col. 1, line 62, after "ligands" change "are" to read

-- as --.

Col. 3, lines 3 and 4, correct the formulae to read

-- $CO(OC_2H_5)_2$ --.

Signed and Sealed this

*Eleventh* Day of *April 1978*

[SEAL]

*Attest:*

RUTH C. MASON
*Attesting Officer*

LUTRELLE F. PARKER
*Acting Commissioner of Patents and Trademarks*